(12) United States Patent
Iida

(10) Patent No.: US 6,307,613 B1
(45) Date of Patent: Oct. 23, 2001

(54) LIQUID CRYSTAL DISPLAY PANEL WITH PLURALITY OF ALIGNMENT MARKS WITHIN THE WIRING LAYER

(75) Inventor: Takayasu Iida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/433,967

(22) Filed: Nov. 4, 1999

(30) Foreign Application Priority Data

Nov. 5, 1998 (JP) .................................................. 10-314679

(51) Int. Cl.$^7$ ........................... G02F 1/1333; G02F 1/136
(52) U.S. Cl. ............................... 349/158; 349/44; 349/110
(58) Field of Search .................................... 349/158, 110, 349/44, 191; 257/72, 59

(56) References Cited

U.S. PATENT DOCUMENTS 6,211,935 * 4/2001 Yamada ................................. 349/149

FOREIGN PATENT DOCUMENTS

| 59-9638 | 1/1984 | (JP) . |
|---|---|---|
| 62-287222 | 12/1987 | (JP) . |
| 5-216021 | 8/1993 | (JP) . |
| 6-82772 | 3/1994 | (JP) . |
| 08-304846-A | * 11/1996 | (JP) . |
| 10-209581-A | * 8/1998 | (JP) . |
| 10-282464 | 10/1998 | (JP) . |

* cited by examiner

Primary Examiner—William L. Sikes
Assistant Examiner—Tarifur R. Chowdhury
(74) Attorney, Agent, or Firm—McGinn & Gibb, PLLC

(57) ABSTRACT

A liquid crystal display panel is improved in production yield, production efficiency and in display quality due to its easiness of checking alignment of a polarizer with respect to its corresponding TFT substrate. The liquid crystal display panel is easily downsized. In the liquid crystal display panel, the TFT substrate is provided with alignment checking marks for checking alignment of the polarizer with respect to the TFT substrate. Each of these marks are formed by selectively removing a part of each of common electrode wiring layers, and disposed under a light shielding layer formed on a color filter substrate, which presents a sharp contrast between the light shielding layer and these wiring layers to enhance a visual checking operation of alignment of the polarizer. The light shielding layer prevents light leakage in these alignment checking marks.

9 Claims, 7 Drawing Sheets

<judgeme : good>

<judgement : bad>

<judgeme : good>

<judgement : bad>

LIQUID CRYSTAL DISPLAY PANEL WITH PLURALITY OF ALIGNMENT MARKS WITHIN THE WIRING LAYER

BACKGROUND OF THE INVENTION

1. Field of the Invention

The present invention relates to a liquid crystal display panel, and more particularly to an active matrix type liquid crystal display panel provided with an alignment checking mark for checking alignment of a first polarizer with respect to its corresponding substrate in the liquid crystal display panel.

2. Description of the Related Art

In general, the liquid crystal display panel is constructed of: a glass substrate (hereinafter referred to as the TFT substrate) provided with a plurality of thin film transistors (hereinafter referred to as the TFTs); another glass substrate (hereinafter referred to as the CF substrate) provided with a color filter (hereinafter referred to as the CF substrate); a liquid crystal layer sandwiched between the TFT substrate and the CF substrate; and, a pair of polarizers each of which is applied to each of the TFT substrate and the CF substrate. In fabricating such a liquid crystal display panel, it is necessary for each of the polarizers to be precisely aligned in position with each of the TFT substrate and the CF substrate. Further, in order to keep constant in production quality the liquid crystal display panel, it is necessary to check alignment of the polarizer after completion of its application to each of the TFT substrate and the CF substrate. Further, in order to improve the liquid crystal display panel both in production quality and in productivity, it is important to check alignment of the polarizer precisely and in a speedy manner.

Heretofore, checking alignment of the polarizer and the CF substrate has been performed with reference to a side edge of the CF substrate and its corresponding side edge of the polarizer. In other words, by using the polarizer which is similar to the CF substrate in shape but slightly smaller in size than the CF substrate (for example, by the amount of from 1 to 0.5 mm in each side), a gap in each side between the CF substrate and the corresponding polarizer is visually checked. In the case that the CF plate and the polarizer are precisely aligned with each other, the same gap is observed in every side. Consequently, with respect to the CF substrate, it is possible to visually check alignment of the polarizer with practically allowable accuracy.

In contrast with the above, it is not possible to perform an alignment operation of the polarizer with respect to the TFT substrate in the same manner as that described above, because: in general, the TFT substrate is provided with a terminal region for mounting therein a drive IC circuit (i.e., Integrated Circuit serving as a drive circuit), and therefore larger in size than the CF substrate in plan view by the amount of the corresponding area of such terminal region. As for a display area of the liquid crystal display panel, there is substantially no difference between the TFT substrate and the CF substrate. As a result, the terminal region of the TFT substrate is placed off a side edge line of the CF substrate in plan view. Further, in order to avoid interface between the liquid crystal display panel and a mechanism element of a module in which the liquid crystal display panel is mounted, the polarizer of the liquid crystal display panel is restricted in plan view to a plane size larger than the display area of the liquid crystal display panel by the amount of from approximately 1 to approximately 2 mm in each of width and height. In this case, even when the alignment operation of the polarizer and the TFT substrate is precisely performed, a gap between the side edge of the TFT substrate and the corresponding side edge of the polarizer varies in each of side edges of the TFT substrate (for example, within a range of from 1 to 5 mm). Consequently, as for the TFT substrate, it is difficult to visually check alignment of the polarizer and the TFT substrate in the same manner as that used in the case of the CF substrate.

On the other hand, Japanese Patent Laid-Open No. Hei 5-216021 discloses a conventional liquid crystal display panel which is capable of checking alignment of a substrate and a polarizer with the use of an alignment checking mark.

FIG. 7 shows an exploded perspective view of the conventional liquid crystal display panel disclosed in this Japanese Patent Laid-Open No. Hei 5-216021 (hereinafter referred to the prior art 1).

As is clear from FIG. 7, this conventional liquid crystal display panel is constructed of: a glass substrate (hereinafter referred to as the TFT substrate) 101 provided with a plurality of thin film transistors (i.e., TFT not shown); another glass substrate (hereinafter referred to as the CF substrate) provided with a color layer (i.e., CF layer) 109; a liquid crystal layer sandwiched between these substrates 101 and 109; and, a pair of polarizers 102, 107.

The plurality of the TFTs are arranged in a matrix on a surface 101a of the TFT substrate 101, in which a plurality of pixel electrodes (not shown) are electrically connected with these TFTs. The plurality of the pixel electrodes and the TFTs are combined to form a pixel group region 108 shown in gray in FIG. 7. Further formed on the surface 101a of the TFT substrate 101 are: a plurality of scanning lines (not shown) for feeding a selection signal to each of the TFTs; and, a plurality of signal lines (not shown) for feeding a video signal to each of the TFTs.

In the surface 101a of the TFT substrate 101, formed outside the pixel group region 108 are three common electrode wiring layers 104a, 104b and 104c. As is clear from FIG. 7, each of the common electrode wiring layers 104a, 104b assumes an inverted L-shaped form in plan view, while the remaining common electrode wiring layer 104c assumes a U-shaped form in plan view. A predetermined voltage is supplied from an external source to each of these common electrode wiring layers 104a, 104b and 104c. A transfer electrode 110 is formed in each of these common electrode wiring layers 104a, 104b and 104c and electrically connected with these wiring layers 104a, 104b and 104c.

The polarizer 102 is aligned with and mounted in its mounting area 130 (shown in dotted lines in FIG. 7) which is defined in a rear surface 101b of the TFT substrate 101. The polarizer 102 is larger in size than the pixel group region 108 in plan view to cover the entire pixel group region 108 from the rear surface (101b) side of the TFT substrate 101.

Formed in a rear surface 106b of the CF substrate 106 is a color filter (i.e., CF) layer 109, which comprises: respective pigment dots or strips of R (i.e., red), G (i.e., green), and B (i.e., Blue) colors each arranged in a predetermined pattern; and, a black matrix (not shown) arranged so as to fill a space between these pigment dots or strips of R, G, and B colors, the black matrix being made of light shielding metal or black resins. The CF layer 109 defines a display region 111 in the above conventional liquid crystal display panel.

Integrally formed with the black matrix (not shown) around the outside of the CF layer 109 is a belt-like light shielding layer 105. Formed further outside the light shielding layer 105 are eight pairs of alignment checking marks 103, which are made of the same material as that of the light shielding layer 105 and disposed in four corners of the CF substrate 106.

Formed in surfaces of both the CF layer 109 and the light shielding layer 105 are common electrodes (not shown), each of which is made of transparent and electrically conductive material to cover the entire area of the rear surface 106b of the CF substrate including the alignment checking marks 103. The common electrodes (not shown) are electrically connected with the transfer electrodes 110. A predetermined voltage is supplied from each of the common electrode wiring layers 104a, 104b and 104c to the corresponding one of the common electrodes (not shown) through the corresponding one of the transfer electrodes 110.

On the other hand, the other polarizer 107 is mounted in its mounting area 131 which is defined in a front surface 106a of the CF substrate 106. This polarizer 107 is larger in size than the display region 111 in plan view to cover the entire display region 111 from the front surface (106a) side of the CF substrate 106.

In the conventional liquid crystal display panel shown in FIG. 7, by comparing the side edges of each of the polarizers 102 and 107 with the alignment checking marks 103 of the CF substrate 106, it is possible to check alignment of each of the polarizers 102 and 107 with respect to the CF substrate 106.

Incidentally, it is also possible to provide the alignment checking marks 103 in the TFT substrate 101. In this case, it is possible to check alignment of each of the polarizers 102 and 107 with respect to the TFT substrate in the same manner as that employed in the case of the CF substrate 106.

In addition to the above conventional liquid crystal display panel, other conventional liquid crystal display panels are also disclosed in Japanese Patent Laid-Open Nos.: Hei6-82772 (hereinafter referred to as the prior art 2); Sho59-9638 (hereinafter referred to as the prior art 3); and, Sho62-287222 (hereinafter referred to as the prior art 4).

In the conventional liquid crystal display panel disclosed in the prior art 2, there is employed laser radiation to evaporate a part of the light shielding layer, so that the alignment checking mark is formed in the part of the light shielding layer of the CF substrate, which mark makes it possible to precisely align the TFT substrate with respect to the CF substrate in their stacking operation.

Further, in this conventional liquid crystal display panel disclosed in the prior art 2, alignment in the above-mentioned stacking operation is improved in precision by stacking the TFT substrate and the CF substrate with reference to both: a part of the signal lines formed in the TFT substrate; and, the alignment checking mark formed in the light shielding layer.

On the other hand, in another conventional liquid crystal display panel disclosed in the prior art 3, when a sealing compound is printed on the liquid crystal display element, a positioning mark is also printed on the same liquid crystal display element. Further, when a fixed display portion is printed on the polarizer, the positioning mark is also printed on the same polarizer. Thereafter, both the liquid crystal display element and the polarizer are positioned, stacked and bonded to each other with reference to their positioning marks.

As described above, in the conventional liquid crystal display panel disclosed in the prior art 3, such a separate positioning mark is formed in each of the liquid crystal display element and the polarizer and used as a reference mark in the positioning, stacking and the bonding operation of the liquid crystal display element and the polarizer, so that alignment of the polarizer is improved in precision with respect to the liquid crystal display element.

On the other hand, in further another conventional liquid crystal display panel disclosed in the prior art 4, when a patterning process of a transparent electrode is conducted, a positioning mark of a liquid crystal cell is also formed. Further, the positioning mark is also formed in the polarizer. After that, the liquid crystal cell and the polarizer are positioned and bonded to each other with reference to their positioning marks which are aligned with each other.

As described above, in the further another conventional liquid crystal display panel disclosed in the prior art 4, such a separate positioning mark is formed in each of the liquid crystal cell and the polarizer and used as a reference mark in their positioning and bonding operations to improve alignment of the polarizer in precision with respect to the liquid crystal cell.

In recent years, downsizing and reduction in weight of a liquid crystal display panel used in a notebook type personal computers and like instruments have been enhanced on purpose to improve these instruments in portability. In order to downsize and reduce in weight the liquid crystal display panel of the above type, it is necessary to reduce in size an outside peripheral region (hereinafter referred to as the panel frame region) disposed adjacent to the display region of the liquid crystal display panel. Due to the above necessity, a gap between an outer peripheral edge portion of the CF substrate and that of the display region formed on the same CF substrate is reduced so that the light shielding layer is formed in the outer peripheral region of the CF substrate or in the vicinity of such outer peripheral region.

In the conventional liquid crystal display panel shown in FIG. 7, the alignment checking marks 103 are formed outside the light shielding layer 105. Due to this, when the gap between the outer peripheral edge portion of the CF substrate and that of the display region formed on the same CF substrate is reduced, it is impossible to form the alignment checking marks 103, which makes it impossible to check alignment of the polarizer 102, and therefore impossible to find poor alignment of the polarizer 102 in its alignment checking operation after completion of its mounting operation, which causes a decrease in production yield and further makes it impossible to downsize the liquid crystal display panel of the above type. This is true in the case of the alignment checking mark formed in the TFT substrate.

In the conventional liquid crystal display panel disclosed in the prior art 2, a part of the light shielding layer is evaporated (i.e., removed). Consequently, in the thus partially-evaporated light shielding layer, there is produced a region permitting the light to pass therethrough, which causes leakage of light issued from a backlighting source of the liquid crystal display panel, and therefore impairs the quality of display in the liquid crystal display panel.

On the other hand, in the conventional liquid crystal display panel disclosed in each of the prior arts 3 and 4, since the positioning mark is made of the sealing material or material of the transparent electrode, such a positioning mark is hard to see in checking alignment of the polarizer in its mounting operation, which impairs in efficiency the alignment checking operation of the polarizer after completion of its mounting operation.

SUMMARY OF THE INVENTION

In view of the above, it is an object of the present invention to provide a liquid crystal display panel which is capable of improving in production efficiency and in easiness an operation for visually checking alignment of a polarizer with respect to its corresponding substrate, which improves the liquid crystal display panel of the present invention in production yield and in production efficiency.

It is another object of the present invention to provide a liquid crystal display panel, which is free from any light leakage problem and is improved in its display quality.

It is further another object of the present invention to provide a liquid crystal display panel, which is easy in its downsizing.

According to a first aspect of the present invention, there is provided a liquid crystal display panel comprising:

an active element substrate provided with a pixel group region, the pixel group region being constructed of a plurality of pixel electrodes and a plurality of active elements, each of which is electrically connected with the corresponding one of the pixel electrodes;

a color filter substrate provided with a color layer and a common electrode, the color filter substrate being oppositely disposed from the active element substrate;

a liquid crystal layer interposed between the active element substrate and the color filter substrate;

a first polarizer mounted on the active element substrate;

a second polarizer mounted on the color filter substrate;

a light shielding layer for covering an outer peripheral region of the color filter layer, the light shielding layer being formed on the color filter substrate;

a wiring layer formed on an outside region of a pixel group region of the active element substrate; and a mark for checking alignment of the first polarizer with respect to the corresponding active element substrate, wherein the mark is formed by selectively removing a part of the wiring layer and is disposed under the light shielding layer.

A preferable mode is one wherein the wiring layer is one for applying a predetermined voltage to the common electrode. In this mode, since the wiring layer is relatively large in size in plan view, it is possible to form the alignment checking mark in an easy manner.

Also, a preferable mode is one wherein the alignment checking mark is disposed in a position corresponding to each of corner portions of the first polarizer. In this mode, an operation for checking alignment of the first polarizer is further enhanced.

Also, a preferable mode is one wherein the alignment checking mark assumes a substantially inverted L-shaped opening form.

Also, a preferable mode is one wherein the alignment checking mark is constructed of a pair of openings.

Also, a preferable mode is one wherein each of the openings in the pair described above assumes a substantially rectangular shape.

with the above construction, it is possible to align the first polarizer and the corresponding TFT substrate in an easy manner, which improves the liquid crystal display panel of the present invention in production yield and production efficiency.

Further, the liquid crystal display panel of the present invention having the above construction is free from any light leakage problem, and is improved in display quality. In addition to the above, the liquid crystal display panel of the present invention having the above construction is capable of being easily downsized.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

The best modes for carrying out the present invention will be described in detail using embodiments of the present invention with reference to the accompanying drawings.

First Embodiment

Figure 1:
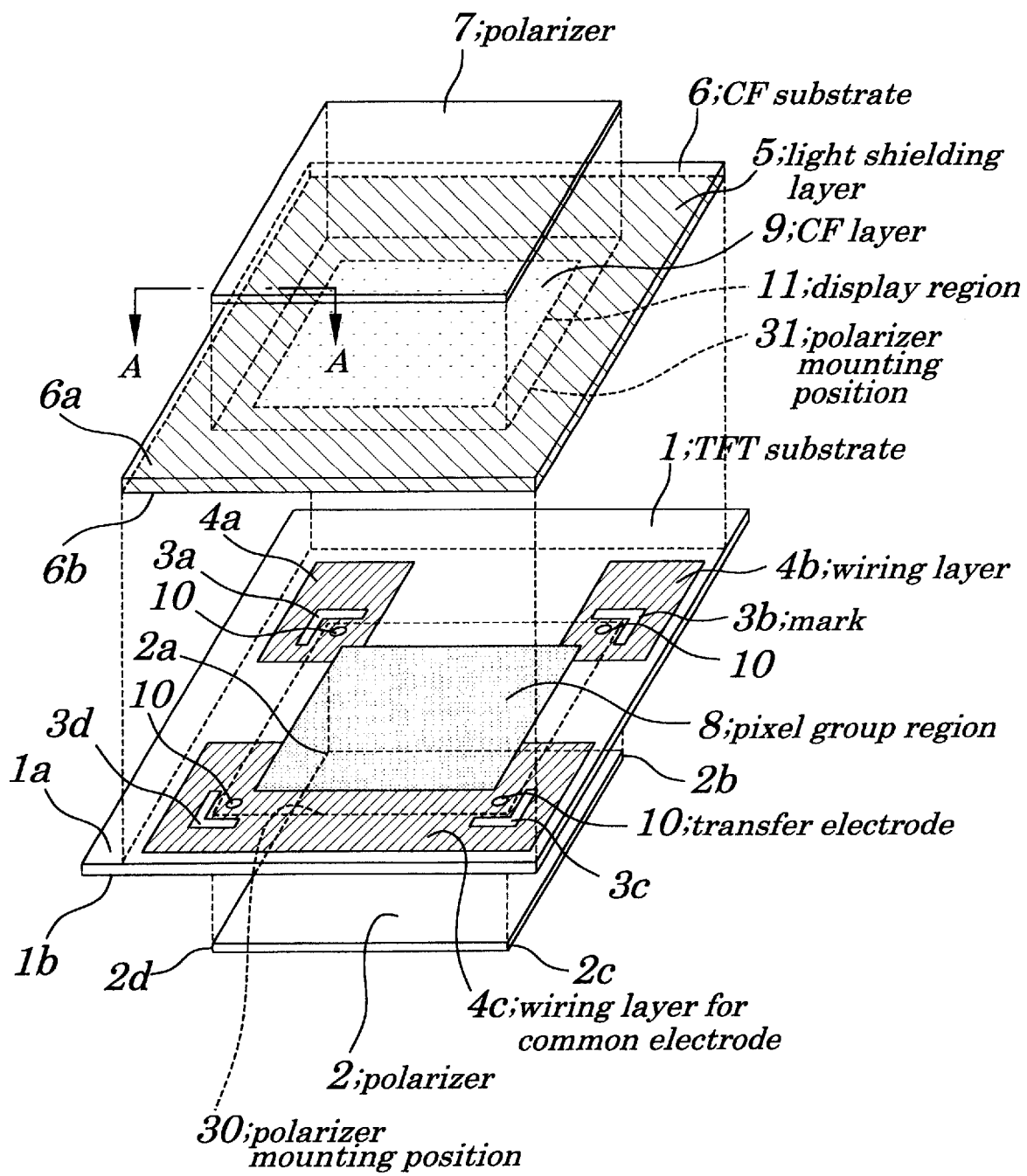
FIG. 1 is an exploded perspective view of a first embodiment of a liquid crystal display panel of the present invention.
Figure 2:
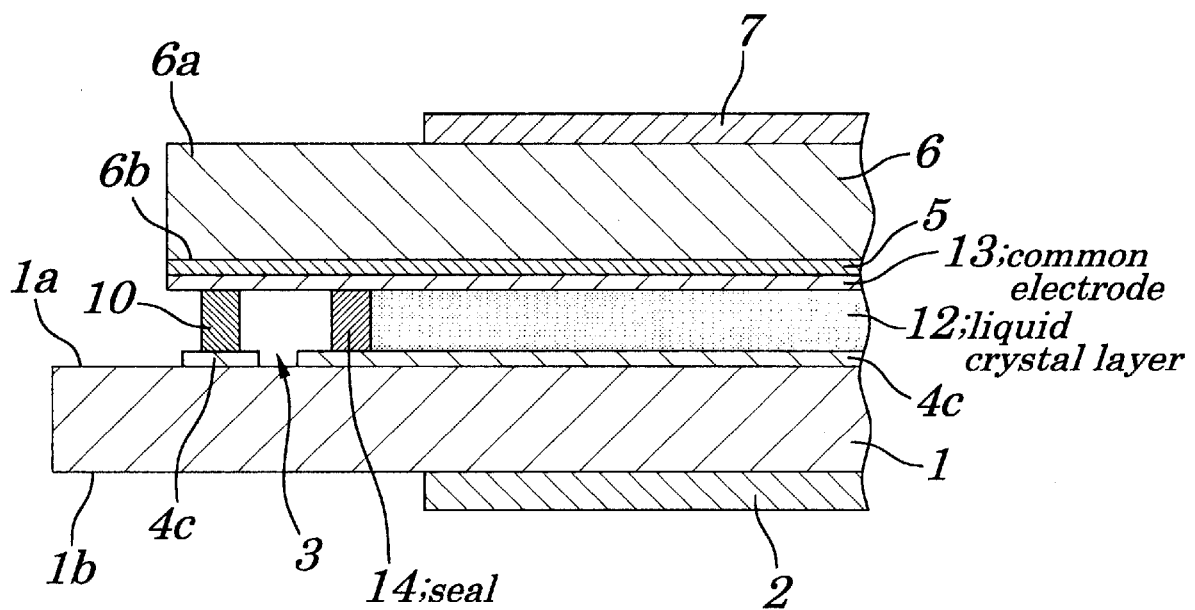
FIG. 2 is a cross-sectional view of the first embodiment of the liquid crystal display panel of the present invention, taken along the line A—A of FIG. 1.

FIGS. 1, 2, 3(a) and 3(b) show a first embodiment of a liquid crystal display panel of the present invention, wherein: FIG. 1 shows an exploded perspective view of the first embodiment of the liquid crystal display panel of the present invention; and, FIG. 2 shows a cross-sectional view of the first embodiment of the liquid crystal display panel of the present invention, taken along the line A—A of FIG. 1.

The liquid crystal display panel of the first embodiment of the present invention shown in FIGS. 1 and 2 is constructed of: a glass substrate 1 (hereinafter referred to as the TFT substrate) provided with a plurality of thin film transistors (hereinafter referred to as the TFTs not shown in the drawings); another glass substrate 6 (hereinafter referred to as the CF substrate) provided with a color filter layer 9 (hereinafter referred to as the CF layer); a liquid crystal layer 12 sandwiched between the TFT substrate 1 and the CF substrate 6; and, a pair of a first polarizer 2 and a second polarizer 7 mounted on the TFT substrate 1 and the CF substrate 6, respectively. The TFT substrate 1 is spaced a predetermined interval away from and oppositely disposed from the CF substrate 6 to define a space therebetween, which space is hermetically sealed with a sealing compound 14 and filled with a liquid crystal layer 12.

The plurality of the thin film transistors (i.e., TFTs) are arranged in a matrix on a front surface 1a of the TFT substrate 1, and electrically connected with a plurality of pixel electrodes (not shown) formed on the front surface 1a of the TFT substrate 1. These pixel electrodes (not shown) and the TFTs are combined to form a pixel group region 8 on the front surface 1a of the TFT substrate 1. Further formed on the front surface 1a of the TFT substrate 1 are: a plurality of scanning lines (not shown) for feeding a selection signal to each of the TFTs (not shown); and, a plurality of signal lines (not shown) for feeding a video signal to each of the TFTs (not shown).

As shown in FIG. 1, further formed outside the pixel group region 8 in the front surface 1a of the TFT substrate 1 are: a pair of inverted L-shaped common electrode wiring layers 4a, 4b; and, a U-shaped common electrode wiring layer 4c. These wiring layers 4a, 4b and 4c are made of electrically conductive material, for example such as chromium (Cr), aluminum (Al), tantalum (Ta) and like metals, or, are formed of a laminated layer made of these metals. Applied to each of these wiring layers 4a, 4b and 4c from an external source is a predetermined voltage. On the other hand, a transfer electrode 10 is formed in a predetermined position on a front surface of each of the wiring layers 4a, 4b and 4c, as shown in FIG. 1, wherein the number of the transfer electrodes 10 are four since two of the transfer electrodes 10 are formed in the opposite end portions of the same U-shaped common electrode wiring layer 4c, as is clear from FIG. 1. Each of these transfer electrodes 10 thus formed is made of a silver paste and like materials, and electrically connected with the corresponding one of the wiring layers 4a, 4b and 4c.

On the other hand, the first polarizer 2 assuming a rectangular shape in plan view is mounted in a predetermined mounting area 30 defined in a rear surface 1b of the TFT substrate 1. The first polarizer 2 is larger in size than the pixel group region 8 in plan view to cover the entire pixel group region 8 from the rear surface (1b) side of the TFT substrate 1.

The wiring layers 4a and 4b are provided with an alignment checking marks 3a and 3b, respectively, wherein the marks 3a and 3b are formed by partially removing the wiring layers 4a and 4b, respectively, the thus removed part being previously selected. On the other hand, as for the remaining wiring layer 4c assuming the U-shaped form, a pair of additional alignment checking marks 3c, 3d are formed by partially removing the wiring layer 4c, wherein the thus removed parts are previously selected. These alignment checking marks 3a, 3b, 3c and 3d are placed in predetermined positions corresponding to those of corner portions 2a, 2b, 2c and 2d of the first polarizer 2, i.e., placed in predetermined positions on extension lines of diagonal lines of the mounting area 30 defined as to the first polarizer 2.

Figure 3A:
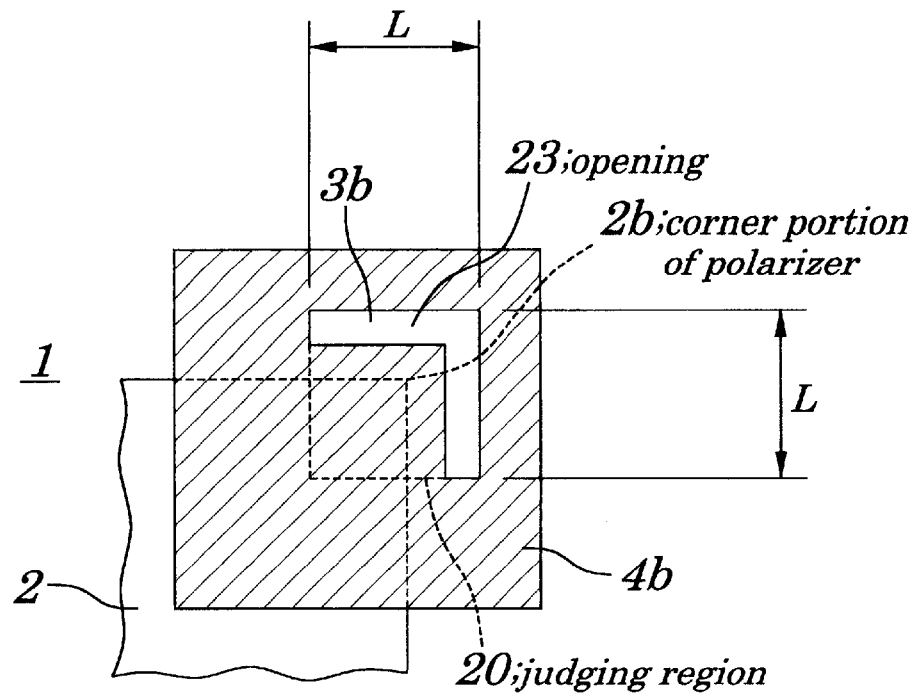
FIG. 3(a) is a plan view of a corner portion of a first polarizer upon which an alignment checking mark is overlaid, illustrating the first polarizer properly aligned with respect to a TFT substrate in the first embodiment of the liquid crystal display panel of the present invention shown in FIG. 1.

On the other hand, FIG. 3(a) shows a plan view of the corner portion of the first polarizer 2 upon which the alignment checking mark 3b is overlaid, illustrating the first polarizer 2 properly aligned in the first embodiment of the liquid crystal display panel of the present invention shown in FIG. 1. As shown in FIG. 3(a), the alignment checking mark 3b is constructed of a substantially inverted L-shaped opening 23 formed in the wiring layer 4b, wherein the inverted L-shaped opening 23 is formed by combining a pair of rectangular shapes with each other. A length "L" of one side of the opening 23 is set at a predetermined value depending on both the dimensions of the first polarizer 2 in plan view and an allowable level in alignment of the first polarizer 2. For example, the length "L" of one side of the opening 23 is set at a value of from approximately 0.3 to approximately 1 mm. Such a opening 23 defines a judging area 20 for judging as to whether or not the first polarizer 2 is precisely aligned with respect to the TFT substrate 1. As for each of the remaining marks 3a, 3c and 3d, each of these marks 3a, 3c and 3d is formed in the same manner as that described in the above in connection with the mark 3b. Further, for each of the remaining marks 3a, 3c and 3d, the corresponding judging area 20 is also provided.

As shown in FIGS. 1 and 2, formed in the rear surface 6b of the CF substrate 6 is the CF layer 9 which comprises: respective pigment dots or strips of R (i.e., red), G (i.e., green), and B (i.e., Blue) colors each arranged in a predetermined pattern; and, a black matrix (not shown) arranged so as to fill a space between these pigment dots or strips of R, G, and B colors, the black matrix being made of light shielding metal or black resins. The CF layer 9 defines a display region 11 of the first embodiment of the liquid crystal display panel of the present invention. This display region 11 is substantially equal in size to the pixel group region 8 in plan view. The display region 11 and the pixel group region 8 are stacked together in arrangement. The CF substrate 6 has its outer peripheral region place off the display region 11, wherein such an outer peripheral region thus placed-off forms a panel frame region (not shown).

Integrally formed with the black matrix (not shown) around the outside of the CF layer 9 is a belt-like light shielding layer 5, which is made of black resins or black light-shielding metals. The light shielding layer 5 is so formed as to cover all the alignment checking marks 3a, 3b, 3c and 3d of the TFT substrate 1 from above.

Formed on a surface of each of the CF layer 9 and the light shielding layer 5 is a common electrode 13, which is made of a transparent and electrically conductive material, for example such as ITO (i.e., Indium Tin Oxide) and like metals. This common electrode 13 covers the entire rear surface 6b of the CF substrate 6, and is electrically connected with the transfer electrodes 10. Consequently, a predetermined voltage supplied from each of the wiring layers 4a, 4b and 4c may be applied to the common electrode 13 through the corresponding one of the transfer electrodes 10.

On the other hand, as is clear from FIGS. 1 and 2, the second polarizer 7 assuming a rectangular shape is mounted in its mounting area 31 defined in the front surface 6a of the CF substrate 6. The second polarizer 7 is larger in size than the display region 11 in plan view so as to cover the entire front surface 6a of the CF substrate 6 from above.

The TFT substrate 1 is larger in size than the CF substrate 6 in plan view. Due to this, a part of the front surface 1a of the TFT substrate 1 is placed off the CF substrate 6, as is clear from FIG. 2. Formed in such a part thus placed off the CF substrate 6 is a terminal (not shown) which is brought into press-contact with a drive IC for issuing a signal to each of the scanning lines and the signal lines of the liquid crystal display panel of the present invention.

Figure 3B:
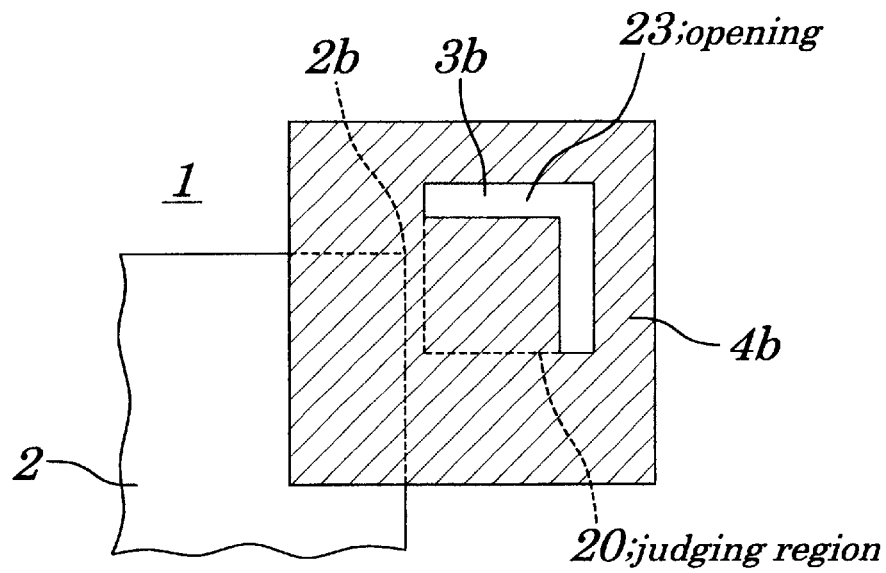
FIG. 3(b) is a plan view of a corner portion of a polarizer upon which the alignment checking mark is overlaid, illustrating the first polarizer misaligned with respect to the TFT substrate in the first embodiment of the liquid crystal display panel of the present invention shown in FIG. 1.

In the liquid crystal display panel according to the first embodiment of the present invention having the above construction, an alignment checking operation of the first polarizer 2 with respect to the TFT substrate 1 is performed by visually judging as to whether or not the alignment checking marks 3a, 3b, 3c and 3d overlap in position with the corresponding corner portions 2a, 2b, 2c and 2d of the first polarizer 2, respectively. For example, as for the corner portion 2b of the first polarizer 2, as shown in FIG. 3(a), when the judging area 20 defined in the alignment checking mark 3b of the TFT substrate 1 overlaps in position with the corner portion 2b of the first polarizer 2, alignment of the first polarizer 2 with respect to the TFT substrate 1 is judged as being "good". On the other hand, FIG. 3(b) shows a plan view of the corner portion 2b of the first polarizer 2 upon which the alignment checking mark 3b of the TFT substrate 1 is overlaid, illustrating the first polarizer 2 is misaligned with respect to the TFT substrate 1. In other words, as shown in FIG. 3(b), when the judging area 20 defined in the alignment checking mark 3b of the TFT substrate 1 does not overlap in position with the corner portion 2b of the first polarizer 2, alignment of the first polarizer 2 with respect to the TFT substrate 1 is judged as being "bad". As for each of the remaining marks 3a, 3c and 3d of the TFT substrate 1, alignment thereof is judged in the same manner as that described in the case of the alignment checking mark 3b of the TFT substrate 1. When all the judgements as to alignment of these marks 3a, 3b, 3c and 3d of the TFT substrate 1 with respect to the first polarizer 2 are good, it is possible to judge alignment of the first polarizer 2 "good" with respect to the TFT substrate 1. On the other hand, in the case that any one of these marks 3a, 3b, 3c and 3d is judged as being "bad", alignment of the first polarizer 2 with respect to the TFT substrate 1 is judged as being "bad" as a whole. As is clear from the above, in the first embodiment of the liquid crystal display panel, it is possible to check alignment of the fist polarizer 2 with respect to the TFT substrate 1 in an easy manner.

Incidentally, as for alignment of the second polarizer 7 with respect to the CF substrate 6, it is visually checked with reference to a gap between a side edge of the CF substrate 6 and the corresponding side edge of the second polarizer 7 as is in the conventional liquid crystal display panel.

In the liquid crystal display panel of the first embodiment of the present invention shown in FIGS. 1 and 2, the light shielding layer 5 formed over the alignment checking marks 3a, 3b, 3c and 3d (i.e., openings 23) of the TFT substrate 1 obstructs the light passing through these alignment checking marks 3a, 3b, 3c and 3d of the TFT substrate 1, which enables the liquid crystal display panel of the first embodiment of the present invention to be free from any light leakage problem as to these alignment checking marks 3a, 3b, 3c and 3d. Further, in the liquid crystal display panel of the first embodiment of the present invention, all the wiring layers 4a, 4b and 4c are made of electrically conductive material, for example such as chromium (Cr), aluminum (Al), tantalum (Ta) and like metals, or, are formed of a laminated layer made of these metals all of which are excellent in clearness. In addition, the light shielding layer 5 assumes black color. Consequently, it is possible for the liquid crystal display panel of the present invention to present a sharp contrast between: the light shielding layer 5 which is visible through all the alignment checking marks 3a, 3b, 3c and 3d (i.e., openings 23) of the TFT substrate 1; and, the wiring layers 4a, 4b and 4c. Due to such a sharp contrast, it is easy to visually check alignment of the first polarizer 2 with respect to the TFT substrate 1 in fabricating the liquid crystal display panel of the present invention.

As described above, in the first embodiment of the liquid crystal display panel of the present invention, since it is easy to visually check alignment of the first polarizer 2 with respect to the TFT substrate 1 with reference to the TFT substrate's alignment checking marks 3a, 3b, 3c and 3d which are excellent in visibility, an alignment checking operation of the liquid crystal display panel of the present invention is enhanced. In addition, after completion of the alignment checking operation of the first polarizer 2 with respect to the corresponding TFT substrate 1, it is possible to remove misaligned ones of the first polarizers 2 without fail, which makes it possible to prevent the misaligned polarizers 2 from entering a process step subsequent to the alignment checking operation. Further, as for the misaligned polarizers 2 thus found in the alignment checking operation, since it is possible to correct them in alignment in an easy manner, the first embodiment of the liquid crystal display panel of the present invention is improved in production yield.

Further, in the first embodiment of the liquid crystal display panel of the present invention having the above construction, since there is no fear that the alignment checking marks 3a, 3b, 3c and 3d of the TFT substrate 1 suffer from any light leakage problem, the liquid crystal display panel of the present invention is improved in its display quality. Furthermore, since all the alignment checking marks 3a, 3b, 3c and 3d of the TFT substrate 1 are formed within the common electrode wiring layers 4a, 4b and 4c, it is possible to apply the present invention to even a small-sized liquid crystal display panel which is also small in its panel frame region in size.

Second Embodiment

Figure 4:
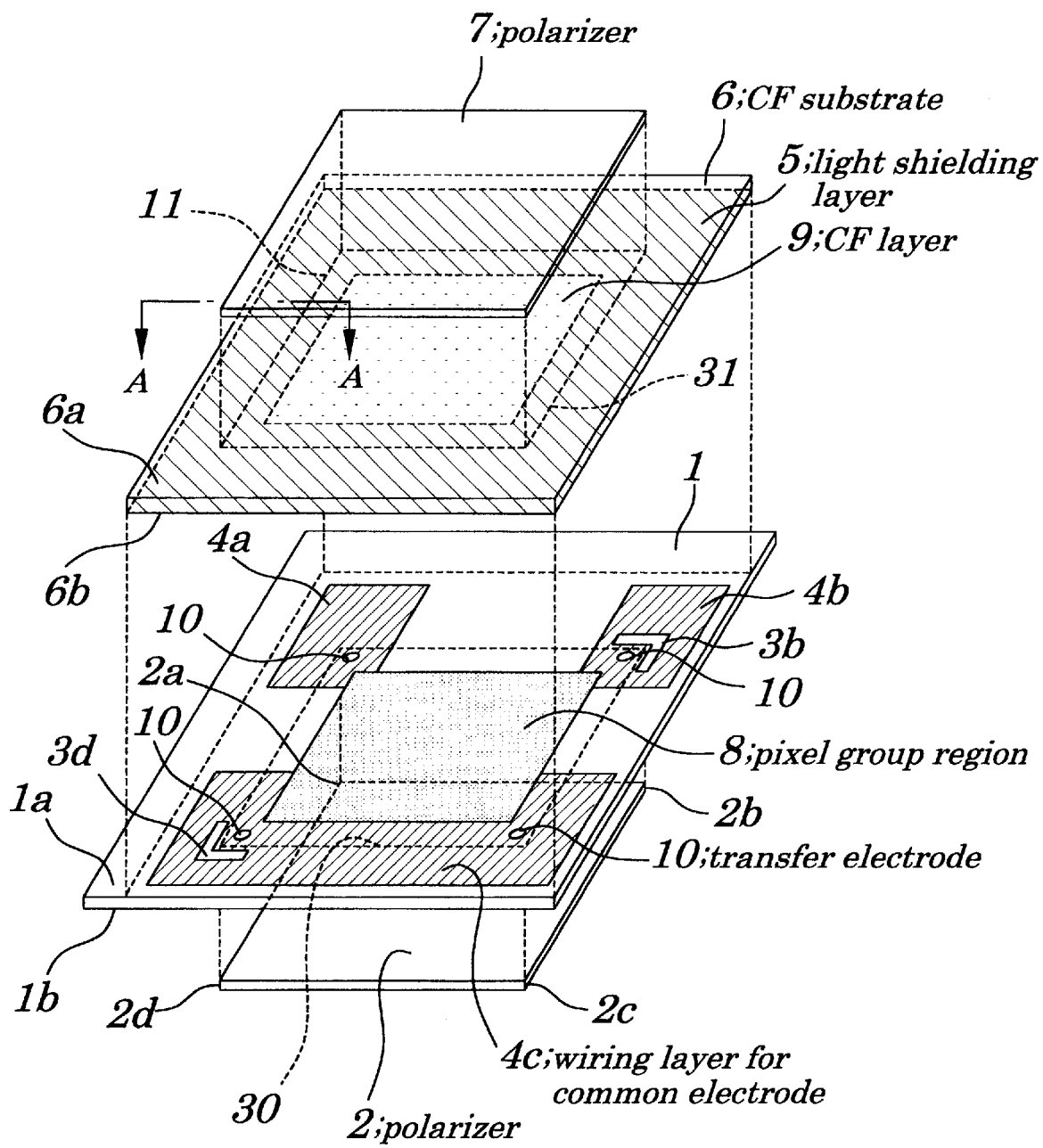
FIG. 4 is an exploded perspective view of a second embodiment of the liquid crystal display panel of the present invention.

FIG. 4 shows an exploded perspective view of a second embodiment of the liquid crystal display panel of the present invention.

The liquid crystal display panel of this second embodiment of the present invention shown in FIG. 4 is similar to the first embodiment of the liquid crystal display panel of the present invention shown in FIGS. 1 and 2, except that the alignment checking marks 3a, 3c of the first embodiment are eliminated from this second embodiment. Consequently, in order to avoid redundancy in description, parts of the second embodiment of the present invention shown in FIG. 4, which are similar to those of the first embodiment of the present invention shown in FIGS. 1 and 2 will be denoted by the same reference numerals and letters as those used in the first embodiment, and therefore will not be described again in this second embodiment of the present invention shown in FIG. 4.

The liquid crystal display panel of the second embodiment of the present invention is suitable in construction for a small-sized liquid crystal display panel which is also small in its panel frame region in size. More particularly, in the small-sized liquid crystal display panel having a construction in which all the common electrodes wiring layers 4a, 4b and 4c are not sufficient in size for formation of four pieces of the alignment checking marks 3a, 3b, 3c and 3d therein, as shown in FIG. 4, it is possible to remove the marks 3a, 3c without impairing in precision the alignment checking operation of the first polarizer 2 with respect to the TFT substrate 1 in the second embodiment of the present invention. In other words, with the use of only two pieces of the alignment checking marks 3b, 3d formed on the extension lines of the same diagonal line of the mounting area 30 defined in the rear surface 1b of the TFT substrate 1, it is possible to precisely align the first polarizer 2 with respect to the TFT substrate 1. Incidentally, it is preferable that the outer dimensions of the first polarizer 2 are previously ensured in precision.

Also in the second embodiment of the liquid crystal display panel of the present invention shown in FIG. 4, it is possible to align the second polarizer 2 with respect to the TFT substrate 1 in an easy manner as is in the first embodiment of the liquid crystal display panel of the present invention shown in FIGS. 1 to 3(b). Consequently, the same effects as those obtained in the first embodiment of the present invention are also obtained in this second embodiment of the present invention shown in FIG. 4. Further, in the second embodiment of the liquid crystal display panel of the present invention shown in FIG. 4, since it suffices to visually check only two marks 3b, 3d in the alignment checking operation of the first polarizer 2 with respect to the TFT substrate 1, it is possible for the second embodiment of the present invention shown in FIG. 4 to save time and labor in the alignment checking operation in comparison with the first embodiment of the present invention shown in FIGS. 1 to 3(b).

Third Embodiment

Figure 5:
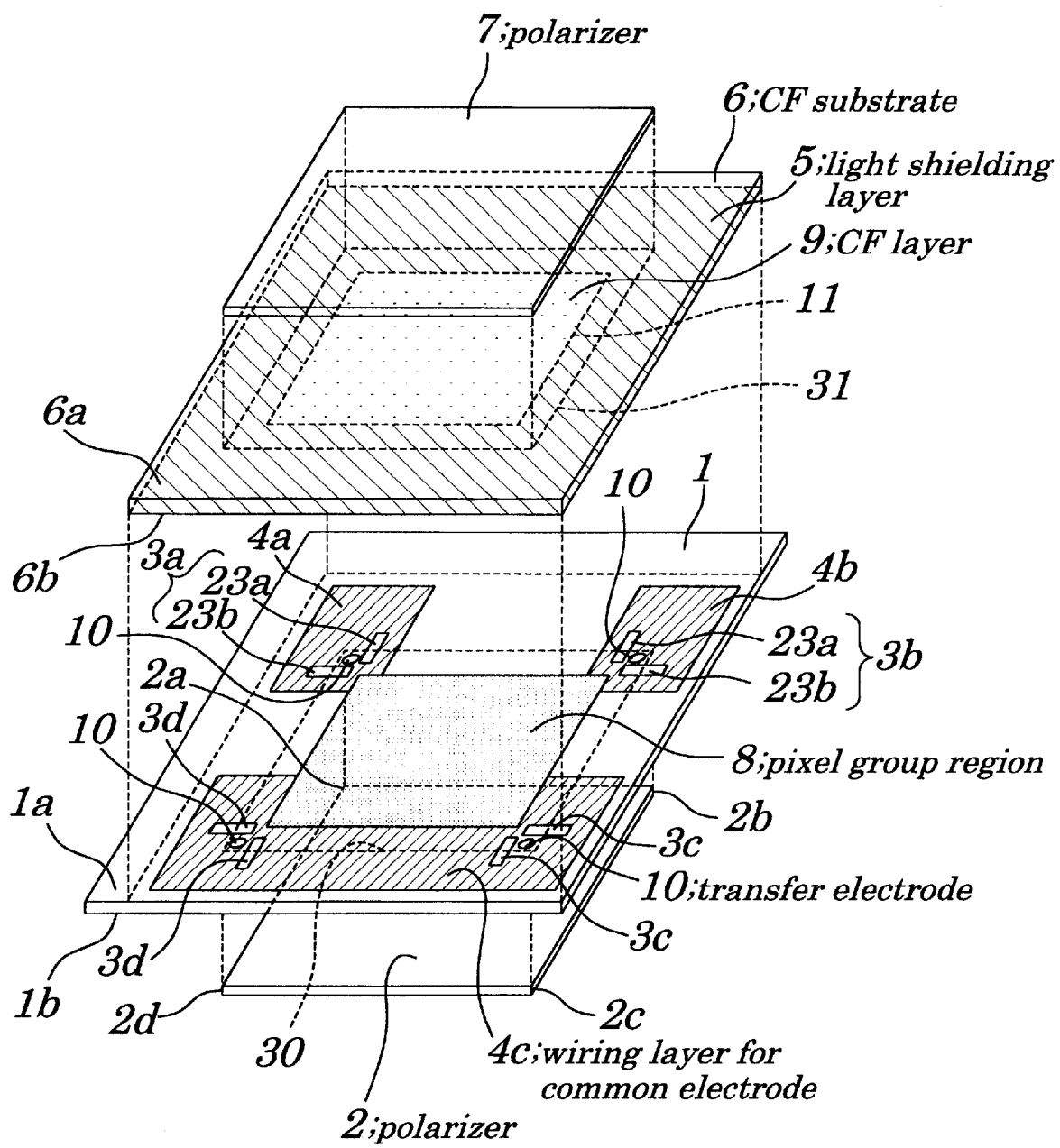
FIG. 5 is an exploded perspective view of a third embodiment of a liquid crystal display panel of the present invention.

FIG. 5 shows an exploded perspective view of a third embodiment of the liquid crystal display panel of the present invention.

The liquid crystal display panel of this third embodiment of the present invention shown in FIG. 5 is similar to the first embodiment of the liquid crystal display panel of the present invention shown in FIGS. 1 and 2, except that each of the alignment checking marks 3a, 3b, 3c and 3d of this third embodiment of the present invention shown in FIG. 5 is constructed of a vertical opening 23a and a horizontal opening 23b which extends in a direction perpendicular to a longitudinal axis of the vertical opening 23a. Consequently, in order to avoid redundancy in description, parts of the third embodiment of the present invention shown in FIG. 5, which are similar to those of the first embodiment of the present invention shown in FIGS. 1 and 2 will be denoted by the same reference numerals and letters as those used in the first embodiment, and therefore will not be described again in this third embodiment of the present invention shown in FIG. 5.

In the liquid crystal display panel of the third embodiment of the present invention, as shown in FIG. 5, the alignment checking marks 3a and 3b are formed by selectively removing parts of the wiring layers 4a and 4b, respectively. On the other hand, the remaining wiring layer 4c has its parts selectively removed to form the remaining alignment checking marks 4c, 4d. In each of these alignment checking marks 3a, 3b, 3c and 3d, its constituent openings 23a, 23b are symmetrically arranged with respect to the diagonal line of the mounting area 30, as is clear from FIG. 5. More particularly, the alignment checking marks 3a, 3b, 3c and 3d of the TFT substrate 1 are positioned in the corresponding predetermined locations on the extension lines of the diagonal lines of the mounting area 30 which is defined in the rear surface 1b of the TFT substrate 1 for mounting the first polarizer 2 thereon.

Figure 6A:
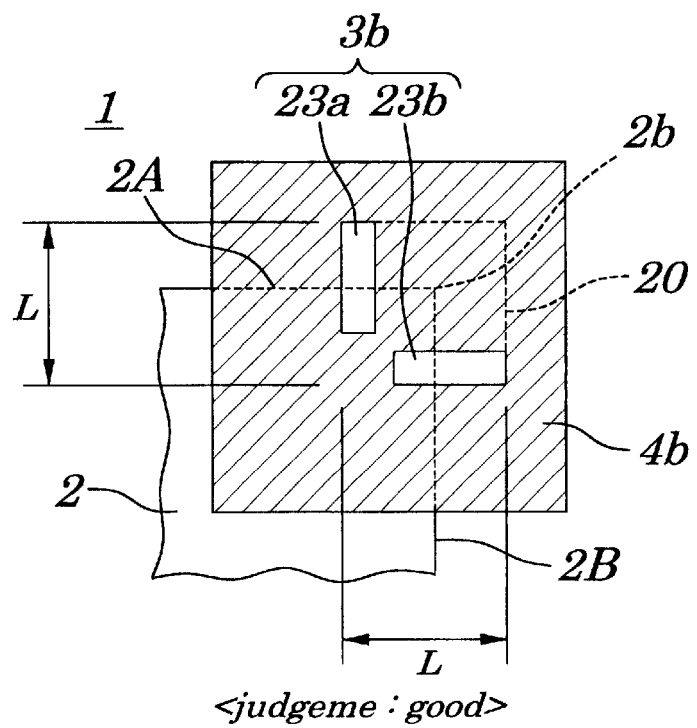
FIG. 6(a) is a plan view of a corner portion of the first polarizer upon which the alignment checking mark is overlaid, illustrating the first polarizer properly aligned with respect to the TFT substrate in the third embodiment of the liquid crystal display panel of the present invention shown in FIG. 5.
Figure 6B:
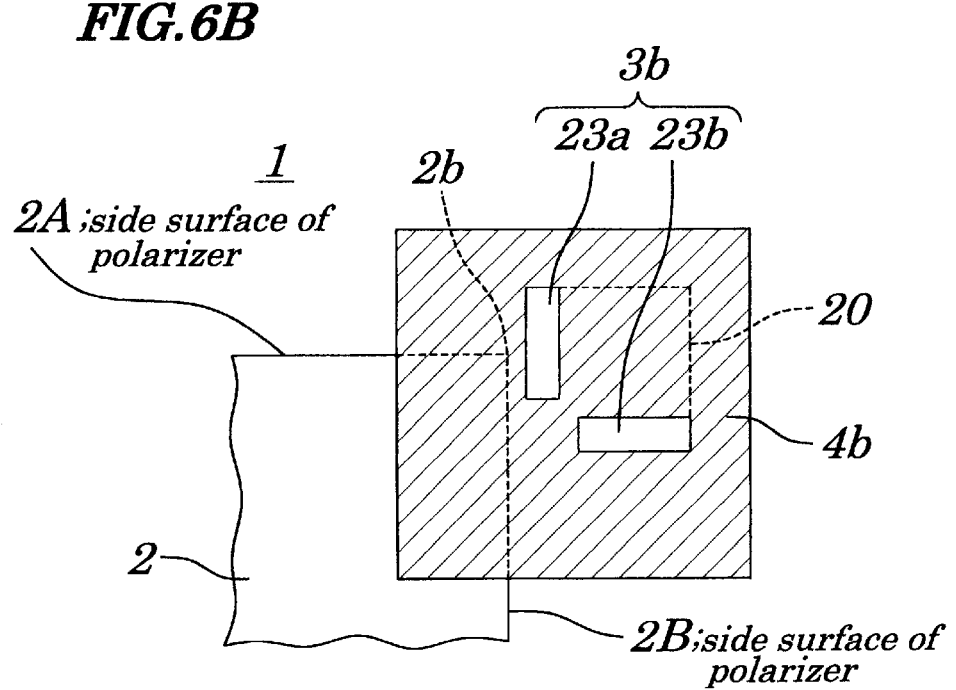
FIG. 6(b) is a plan view of the corner portion of the first polarizer upon which the alignment checking mark is overlaid, illustrating the first polarizer misaligned with respect to the TFT substrate in the third embodiment of the liquid crystal display panel of the present invention shown in FIG. 5.
Figure 7:
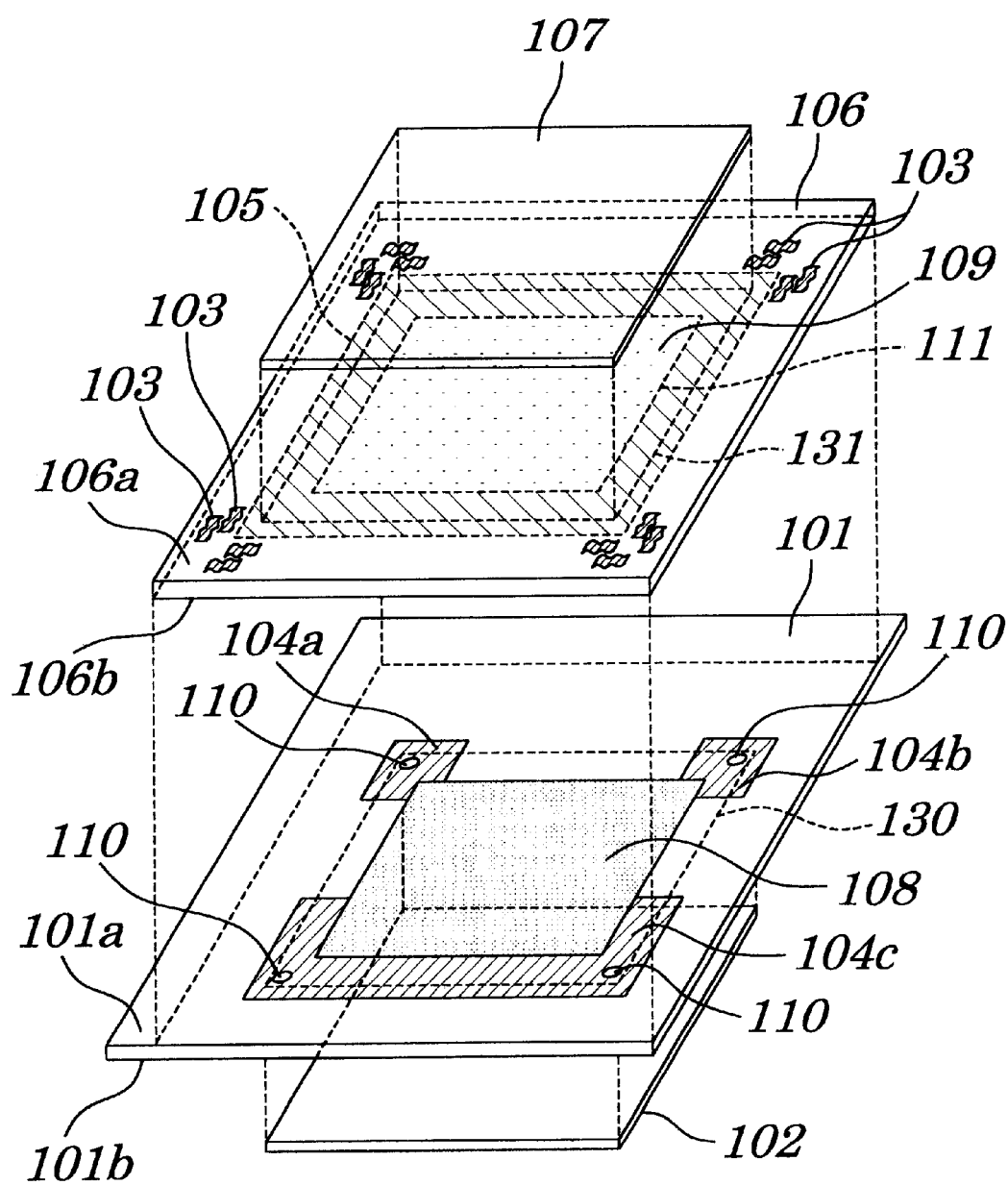
FIG. 7 is an exploded perspective view of a conventional liquid crystal display panel.

On the other hand, FIG. 6(a) shows a plan view of the corner portion 2b of the first polarizer 2 upon which the alignment checking mark 3b of the TFT substrate 1 is overlaid, illustrating the first polarizer 2 properly aligned with respect to the TFT substrate 1 in the third embodiment of the liquid crystal display panel of the present invention shown in FIG. 5. FIG. 6(b) shows a plan view of the corner portion 2b of the first polarizer 2 upon which the alignment checking mark 3b is overlaid, illustrating the first polarizer 2 misaligned with respect to the TFT substrate 1 in the third embodiment of the liquid crystal display panel of the present invention shown in FIG. 5. As shown in FIG. 6(a), the alignment checking mark 3b is constructed of a pair of the rectangular openings 23a, 23b formed in the wiring layers 4b. A length "L" in each of these openings 23a, 23b is set at a predetermined value on the basis of the outer dimensions of the first polarizer 2 and the allowable value in alignment of the first polarizer 2 with respect to the TFT substrate 1. For example, such a predetermined value of the length "L" is set within a range of from approximately 0.3 to approximately 1 mm. By the use of these openings 23a and 23b, it is possible to define, in each of the wiring layers 4a, 4b and 4c, the judging area 20 for judging as to whether or not the first polarizer 2 is properly aligned with respect to the TFT substrate 1.

As shown in FIG. 5, the light shielding layer 5 is so formed as to cover all the alignment checking marks 3a, 3b, 3c and 3d of the TFT substrate 1 from above.

In the third embodiment of the liquid crystal display panel of the present invention shown in FIG. 5, it is possible to judge as to whether or not the first polarizer 2 is properly aligned with respect to the TFT substrate 1 by visually checking whether or not the judging area 20 of each of these marks 3a, 3b, 3c and 3d of the TFT substrate 1 overlaps in position with the corresponding one of the corner portions 2a, 2b, 2c and 2d of the first polarizer 2.

For example, as shown in FIG. 6(a), in the case that the judging area 20 of the alignment checking mark 3b of the TFT substrate 1 overlaps in position with the corner portion 2b of the first polarizer 2, it is judged that the first polarizer 2 is properly aligned with respect to the TFT substrate 1. In other words, in this case, alignment of the first polarizer 2 with respect to the TFT substrate 1 is judged as being "good", as shown in FIG. 6(a). On the other hand, as shown in FIG. 6(b), in the case that the judging area 20 of the alignment checking mark 3b of the TFT substrate 1 does not overlap in position with the corner portion 2b of the first polarizer 2, it is judged that alignment of the first polarizer 2 is "bad" with respect to the TFT substrate 1. Alternatively, by checking whether or not the side edges 2A and 2B of the first polarizer 2 intersect with the openings 23a and 23b of the alignment checking mark 3b of the TFT substrate 1, respectively, it is possible to judge as to whether or not the first polarizer 2 is properly aligned with respect to the TFT substrate 1. More particularly, only in the case that the side edges 2A and 2B of the first polarizer 2 intersect with the openings 23a and 23b of the mark 3b of the TFT substrate 1, respectively, alignment of the first polarizer 2 is judged as being "good" with respect to the mark 3b of the TFT substrate 1. Otherwise, alignment of the first polarizer 2 is judged as being "bad" with respect to the alignment checking mark 3b of the TFT substrate 1. Alignment of the first polarizer 2 with respect to each of the remaining alignment checking marks 3a, 3c and 3d of the TFT substrate 1 is checked in the same way. As a result, only when the alignment checking marks 3a, 3b, 3c and 3d of the TFT substrate 1 overlap in position with the corner portions 2a, 2b, 2c and 2d of the first polarizer 2, respectively, alignment of the first polarizer 2 is judged as being "good" with respect to the TFT substrate 1 as a whole. Otherwise, alignment of the first polarizer 2 is judged as being "bad" with respect to the TFT substrate 1. As described above, in the third embodiment of the liquid crystal display panel of the present invention shown in FIGS. 5, 6(a) and 6(b), it is possible to check alignment of the first polarizer 2 with respect to the TFT substrate 1 in an easy manner.

Incidentally, as for alignment of the second polarizer 7 with respect to the CF substrate 6, it is judged in the same manner as that of the prior art. In other words, as is in the case of the conventional liquid crystal display panel, alignment of the second polarizer 7 with respect to the CF substrate 6 of the liquid crystal display panel according to the third embodiment of the present invention shown in FIGS. 5, 6(*a*) and 6(*b*) is judged by visually checking a gap between the side edge of the second polarizer 7 and the corresponding side edge of the CF substrate 6.

In the third embodiment of the liquid crystal display panel of the present invention shown in FIG. 5, sine the light shielding layer 5 formed over the alignment checking marks 3*a*, 3*b*, 3*c* and 3*d* (i.e., openings 23*a*, 23*b*) of the TFT substrate 1 obstructs the light passing through each of the alignment checking marks 3*a*, 3*b*, 3*c* and 3*d* of the TFT substrate 1, the liquid crystal display panel of the present invention is free from any light leakage problem.

Further, in the liquid crystal display panel of the third embodiment of the present invention, it is possible to present a sharp contrast between: the light shielding layer 5 which assumes black color and is visible through the alignment checking marks 3*a*, 3*b*, 3*c* and 3*d* each of which are constructed of the openings 23*a*, 23*b* in the TFT substrate 1; and, the wiring layers 4*a*, 4*b* and 4*c* each of which is excellent in clearness. As is clear from the above, in the liquid crystal display panel of the third embodiment of the present invention, the alignment checking marks 3*a*, 3*b*, 3*c* and 3*d* of the TFT substrate 1 are remarkably improved in visibility in the alignment checking operation of the liquid crystal display panel of the present invention.

As described above, in the liquid crystal display panel according to the third embodiment of the present invention, since it is possible to visually check alignment of the first polarizer 2 with respect to the TFT substrate 1 in an easy manner as is in the first embodiment of the present invention shown in FIGS. 1 to 3(*b*) with reference to the alignment checking marks 3*a*, 3*b*, 3*c* and 3*d* which are excellent in visibility, the third embodiment of the present invention shown in FIGS. 5 to 6(*b*) is remarkably improved in efficiency of its alignment checking operation. Further, in the present invention, since it is possible to remove without fail the misaligned products (i.e., liquid crystal display panels) found in the alignment checking operation or process, it is possible for the present invention to improve a process subsequent to the alignment checking process in production efficiency. Further, in the present invention, it is possible to correct the misaligned products or liquid crystal display panels by simply adjusting in alignment the first polarizer 2 with respect to the TFT substrate 1, which remarkably improves the liquid crystal display panel of the present invention in production yield.

Further, in the liquid crystal display panel of the present invention, there is no fear of the light leakage problem. This results in a remarkable improvement in display quality in the liquid crystal display panel of the present invention. Furthermore, in the liquid crystal display panel of the present invention, since the alignment checking marks 3*a*, 3*b*, 3*c* and 3*d* are formed in the common electrode wiring layers 4*a*, 4*b* and 4*c*, it is possible to apply the present invention to even a small-sized liquid crystal display panel which is also small in its panel frame region.

Incidentally, although the liquid crystal display panel of the third embodiment of the present invention shown in FIG. 5 is provided with four pieces of the alignment checking marks 3*a*, 3*b*, 3*c* and 3*d* in the TFT substrate 1, it is possible to reduce the number of these alignment checking marks 3*a*, 3*b*, 3*c* and 3*d* from four (i.e., marks 3*a*, 3*b*, 3*c* and 3*d*) to two (i.e., the marks 3*a*, 3*c*) as is in the second embodiment of the liquid crystal panel of the present invention shown in FIG. 4.

Further, in each of the first, second and the third embodiment of the liquid crystal display panel of the present invention, although each of the alignment checking marks 3*a*, 3*b*, 3*c* and 3*d* is constructed of opening or openings each assuming an L-shaped form or a pair of rectangular forms, it is possible for each of these alignment checking marks 3*a*, 3*b*, 3*c* and 3*d* of the TFT substrate 1 to assume any other suitable form, for example such as crisscross shapes, circular shapes, rectangular shapes, combination of these shapes and the like, in addition to the above-mentioned forms.

As described above, in the liquid crystal display panel of the present invention, it is possible to align the first polarizer 2 and the corresponding TFT substrate 1 in an easy manner, which improves the liquid crystal display panel of the present invention in production yield and in production efficiency. Further, the liquid crystal display panel of the present invention is free from any light leakage problem, and therefore improved in display quality. Further, the liquid crystal display panel of the present invention is capable of being easily downsized.

It is thus apparent that the present invention is not limited to the above embodiments but may be changed and modified without departing from the scope and spirit of the invention.

Finally, the present application claims the Convention Priority based on Japanese Patent Application No. Hei 10-314679 filed on Nov. 5, 1998, which is herein incorporated by reference.

What is claimed is:

1. A liquid crystal display panel comprising:
   an active element substrate provided with a pixel group region, said pixel group region being constructed of a plurality of pixel electrodes and a plurality of active elements, each of which is electrically connected with the corresponding one of said pixel electrodes;
   a color filter substrate provided with a color layer and a common electrode, said color filter substrate being oppositely disposed from said active element substrate;
   a liquid crystal layer interposed between said active element substrate and said color filter substrate;
   a first polarizer mounted on said active element substrate;
   a second polarizer mounted on said color filter substrate;
   a light shielding layer for covering an outer peripheral region of said color filter layer, said light shielding layer being formed on said color filter substrate;
   a wiring layer formed on an outside region of a pixel group region of said active element substrate; and
   a mark for checking alignment of said first polarizer with respect to said active element substrate, wherein said mark is formed by selectively removing a part of said wiring layer and is disposed under said light shielding layer.

2. A liquid crystal display panel according to claim 1, wherein said wiring layer is one for applying a predetermined voltage to said common electrode.

3. A liquid crystal display panel according to claim 1, wherein said mark is disposed in a position corresponding to each of corner portions of said first polarizer.

4. A liquid crystal display panel according to claim 1, wherein said mark assumes a substantially inverted L-shaped opening form.

5. A liquid crystal display panel according to claim 1, wherein said mark is constructed of a pair of openings.

6. A liquid crystal display panel according to claim 5, wherein each of said openings in said pair assumes a substantially rectangular shape.

7. A liquid crystal display panel comprising:

an active element substrate;

a color filter substrate;

a liquid crystal layer interposed between said active element substrate and said color filter substrate;

a first polarizer mounted on said active element substrate;

a second polarizer mounted on said color filter substrate;

a light shielding layer mounted on said color filter substrate;

a wiring layer formed on said active element substrate; and a plurality of marks for checking alignment of said first polarizer with respect to said active element substrate, wherein all of said marks are formed as openings within said wiring layer, being disposed such that light transmitted through said marks is interrupted by said light shielding layer, wherein said first polarizer is devoid of said plurality of said marks.

8. The liquid crystal display panel according to claim 7, wherein each of said marks is placed in position corresponding to each of corner portions of said first polarizer assuming a rectangular shape.

9. The liquid crystal display panel according to claim 7, wherein judging areas are defined with said marks in order to judge as to whether or not said first polarizer is precisely aligned with respect to said active element substrate, thereby each of said marks overlaps in position with each of corner portions of said first polarizer.

* * * * *